(12) United States Patent
Clement et al.

(10) Patent No.: US 8,547,876 B1
(45) Date of Patent: Oct. 1, 2013

(54) INTERMEDIATE FUNCTIONAL DEVICE AND METHOD

(75) Inventors: Russel E. Clement, El Cajon, CA (US); Ayax D. Ramirez, Chula Vista, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 168 days.

(21) Appl. No.: 13/086,265

(22) Filed: Apr. 13, 2011

(51) Int. Cl.
   H04L 12/26 (2006.01)
   H04J 1/16 (2006.01)
   G08C 15/00 (2006.01)
   G06F 11/00 (2006.01)
   G01R 31/08 (2006.01)

(52) U.S. Cl.
   USPC .......... 370/255; 370/235; 370/336; 700/276; 709/223

(58) Field of Classification Search
   USPC .. 370/235–338; 455/418–457; 709/219–229
   See application file for complete search history.

(56) References Cited

U.S. PATENT DOCUMENTS

| | | | |
|---|---|---|---|
| 4,592,048 A | 5/1986 | Beckner et al. | |
| 6,590,928 B1 | 7/2003 | Haartsen | |
| 6,981,082 B2 | 12/2005 | Ho et al. | |
| 7,139,239 B2 | 11/2006 | McFarland | |
| 8,024,073 B2 * | 9/2011 | Imes et al. | 700/276 |
| 8,082,065 B2 * | 12/2011 | Imes et al. | 700/276 |
| 8,099,195 B2 * | 1/2012 | Imes et al. | 700/278 |
| 8,224,282 B2 * | 7/2012 | Songkakul et al. | 455/343.1 |
| 2007/0150565 A1 * | 6/2007 | Ayyagari et al. | 709/223 |
| 2009/0016245 A1 * | 1/2009 | Karls | 370/310 |
| 2009/0117915 A1 * | 5/2009 | Lee et al. | 455/456.1 |
| 2010/0158494 A1 * | 6/2010 | King | 396/56 |
| 2010/0189082 A1 * | 7/2010 | Choi et al. | 370/336 |
| 2010/0279609 A1 * | 11/2010 | Black et al. | 455/41.2 |
| 2011/0085442 A1 * | 4/2011 | Lin et al. | 370/235 |
| 2011/0176469 A1 * | 7/2011 | Kim et al. | 370/311 |

* cited by examiner

*Primary Examiner* — Man Phan
(74) *Attorney, Agent, or Firm* — Kyle Eppele; Peter A. Lipovsky

(57) ABSTRACT

A wireless intermediate functional device (IFD) for wireless communication between reduced functional devices in a star topology network having a central coordinator capable of operating as a network access device (NAD), and with fully functional devices in a mesh topology network also capable of operating as a NAD is described. The IFD is a wireless system that executes IEEE 802.15.4 standard compliant operations and operates as an intermediary between non-compatible devices. Various communication and protocol handshaking and management is facilitated by the IFD, allowing end devices in heterogeneous networks to communicate.

2 Claims, 11 Drawing Sheets

RELATED ART

INTERMEDIATE FUNCTIONAL DEVICE AND METHOD

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 99,252.

BACKGROUND

This disclosure relates generally to the field of communication systems. More particularly, this disclosure relates to an intermediate system for bridging communication between heterogeneous networks.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a wireless intermediate functional device (IFD) for wireless communication with reduced functional devices (RFDs) in a star topology network having a central coordinator capable of operating as a network access device (NAD), and with fully functional devices (FFDs) in a mesh topology network also capable of operating as a NAD, comprising: a processor with memory; a radio frequency transceiver front end communicating with the processor; an antenna coupled to the front end; and a power source providing power to the processor and front end; wherein the processor contains computer instructions for executing IEEE 802.15.4 standard compliant operations; discovering a Network Access Device Announcement (NADA) from a NAD; determining whether the NAD is from a star or mesh network; establishing communication with a designated RFD; and forwarding the NADA to the designated RFD.

In another aspect of the disclosed embodiments, a method for wireless communication between RFDs in a star topology network having a central coordinator capable of operating as a NAD, and with FFDs in a mesh topology network also capable of operating as a NAD, is provided, comprising: providing an IFD comprising: a processor with memory; a radio frequency transceiver front end communicating with the processor; an antenna coupled to the front end; and a power source providing power to the processor and front end; into the star topology and mesh topology networks; executing IEEE 802.15.4 standard compliant operations; discovering a NADA from a NAD via the IFD; determining whether the NAD is from a star or mesh network via the IFD; establishing communication with a designated RFD via the IFD; and forwarding the NADA to the designated RFD.

DETAILED DESCRIPTION

The evolution of local network communication systems has primarily been developed for "computer" specific applications, while non-computer related networks have been relegated to develop their own application specific standards. A consequence of these separate paths is that different communication systems for different platforms have developed, to where there is no easy way to make these heterogeneous systems and their respective devices communicate with each other. Efforts have been expended by the various communities to bring harmony to the communication world, however, such efforts have not been fully integrated into non-computer based networks, or there are still areas of incompatibility.

One attempt to bring some level of harmony is found in the Institute of Electrical and Electronics Engineers (IEEE) Standard 802.15.4, (incorporated herein by reference in its entirety). This standard defines the Physical (Phy) and Medium Access Control (MAC) sub-layer specifications for low data rate wireless personal area network (LR-WPAN) connectivity for fixed, portable and moving devices with low battery consumption requirements, generally operating in wireless (also known as, Radio Frequency (RF)) ranges up to ~100 meters. These systems can be used for setting up inexpensive wireless networks that can be used for industrial control, embedded sensing, medical data collection, building and home automation, and so forth. This standard supports LR-WPANs that may operate in either of two topologies: star topology and peer-to-peer topology (sometimes referred to as "mesh" topology).

Figure 1A:
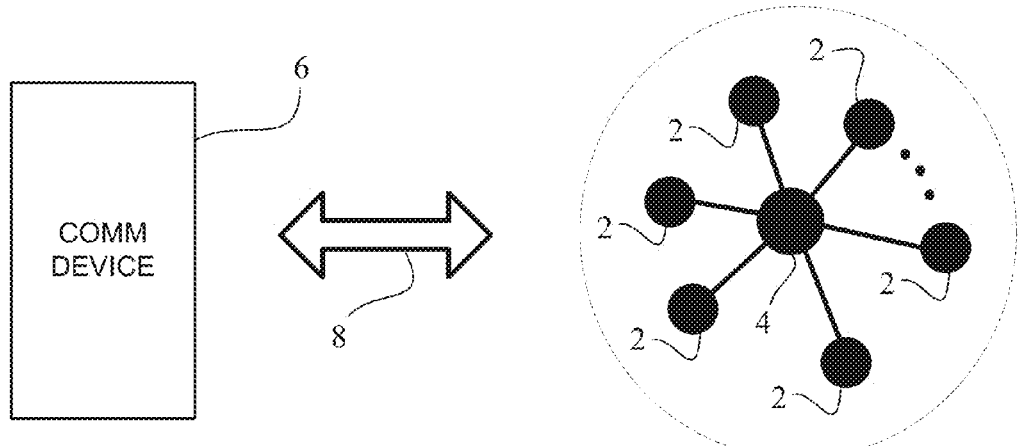
FIGS. 1A-B are illustrations of related art topology configurations.

As shown in the related art diagram of FIG. 1A, a star topology communication is established between multiple end devices 2 and a single central controller 4 called the Personal Area Network (PAN) coordinator. End devices 2 typically are battery-powered, conduct some associated application(s), and are either the initiation or termination point of network communications. The PAN coordinator 4 is usually mains-powered, may also run an application(s), initiates, terminates and routes communications around the network, and acts as the primary controller of the PAN. All communications in a star network are conducted as a single hop between the end device 2 and the PAN coordinator 4. In most embodiments, the star network, either via the PAN coordinator 4 or end device 2 can communicate to an external communication device/system 6, via fixed or wireless channel 8. Typically, such communication is dependent on the particular capabilities of the external system 6 and channel 8. For example, the external communication system 6 may be a facsimile device.

Figure 1B:
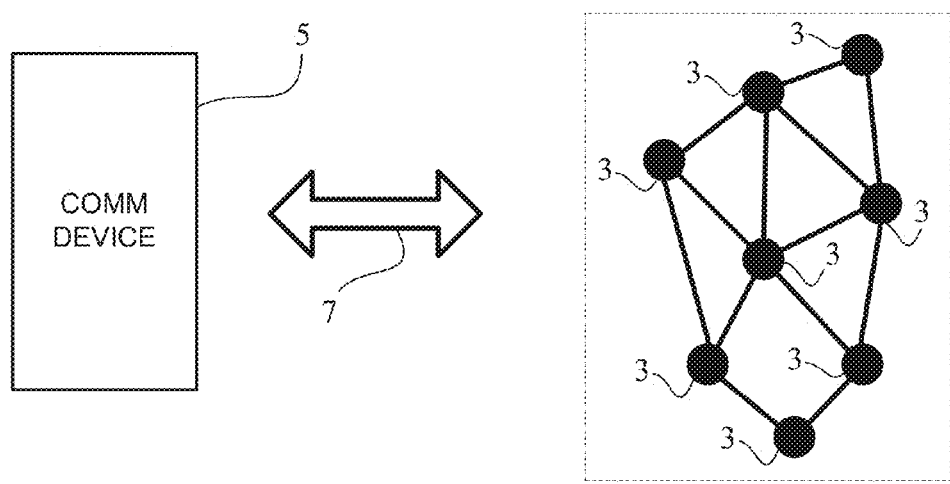

A related art peer-to-peer topology is shown in FIG. 1B, where wireless end devices 3 communicate directly with each other as long as they are in range. Peer-to-peer topology allows for complex network formations that can be ad-hoc, self-organizing and self-healing. This topology allows communications to occur using multiple hops to route messages from any device 3 to any other device 3 on the network. And, in most systems, the peer-to-peer network can communicate to an external communication device/system 5, via wired or wireless channel 7, using any one of the end devices 3. These multiple hopping functions are not detailed by the IEEE 802.15.4 standard described above, but network formation can be added at higher layers by commercial products. One such approach is found in U.S. Pat. No. 7,139,239, titled "Self-healing control network for building automation systems," by Norman R. McFarland, the contents of which are expressly incorporated by reference herein.

As is apparent, a primary hardware distinction between the end devices 3 of the peer-to-peer network and the end devices 2 used in star topologies, is that the peer-to-peer end devices 3 are usually configured with more advanced communication controlling and processing capabilities, allowing them to act as a controller or PAN coordinator, in some instances. Consequently, the end devices 2 used in star topologies are often referred to as RFDs.

RFDs conserve power by eliminating all internal coordinator functions and rely on an external coordinator 4 to manage the PAN. RFDs by design know the address of the PAN coordinator 4 in advance of data exchange. As alluded above, end devices 3 in peer-to-peer networks are more autonomous, often referred to as FFDs and provide their own coordinator functions managing the PAN in concert with all other FFDs in their operational range. FFDs identify themselves when accessing or establishing a network and exchange coordinator functions as necessary. RFDs used in star topologies and FFDs for peer-to-peer topologies cannot be intermingled and cannot function properly with each other, due to their hardware incompatibilities.

Pursuant to the Department of Homeland Security's (DHS) decision to adopt the IEEE Standard 802.15.4 standard to provide communications for monitoring the security of cargo conveyances moving in and out of U.S. shipping ports, a need has arisen for the ability to co-mingle end devices operating in star and peer-to-peer topologies. The initial implementation of these Conveyance Security Device (CSD) systems is stated to be accomplished by employing star topology at a limited number fixed reader points. As such, all end devices for communications that are placed on conveyances (containers) will be RFDs and the mains-powered readers will act as PAN coordinators.

Eventually, to facilitate continuous monitoring of containers in shipping yards (for both commercial and security purposes), DHS has stated an intent to migrate to an Advanced Container Security Device (ACSD) system that can employ peer-to-peer communications while using the existing reader (PAN coordinator) infrastructure. However, during the transition period, ACSD and CSD systems employing both topologies will need to be co-mingled in the commercial shipping environment.

In order to facilitate the interoperability of ACSD and CSD systems during this transition period, a bridging IFD is needed to allow self-organized, ad-hoc communications between RFDs and FFDs, operating in mixed topologies. As of yet, no such hardware device or system for accomplishing star-mesh communication is available, wherein aspects of such a needed hardware device/system, in the form of an IFD are described below. In concert with a hardware device such as the IFD described herein, communication and protocol interoperability within these heterogeneous nodes are addressed by detailing various exemplary processes for managing connection and message transfer between devices.

While the IFD's role is initially described in the context of facilitating the interoperability of ACSD and CSD systems, the adoption of the IEEE 802.15.4 standard can give rise to many other possible applications. For example, the ZigBee® Alliance is a consortium developed to facilitate and support numerous applications based on the IEEE 802.15.4 standard, such as for home automation and home security networks, medical monitoring sensor networks, environmental sensor networks, games and consumer electronics networks. Accordingly, the exemplary IFD described herein can be used as a transition device for any of the aforementioned types of networks, as well as other applicable networks, when there is a need to utilize both RFD and FFD types of end devices in the same network.

Figure 2:
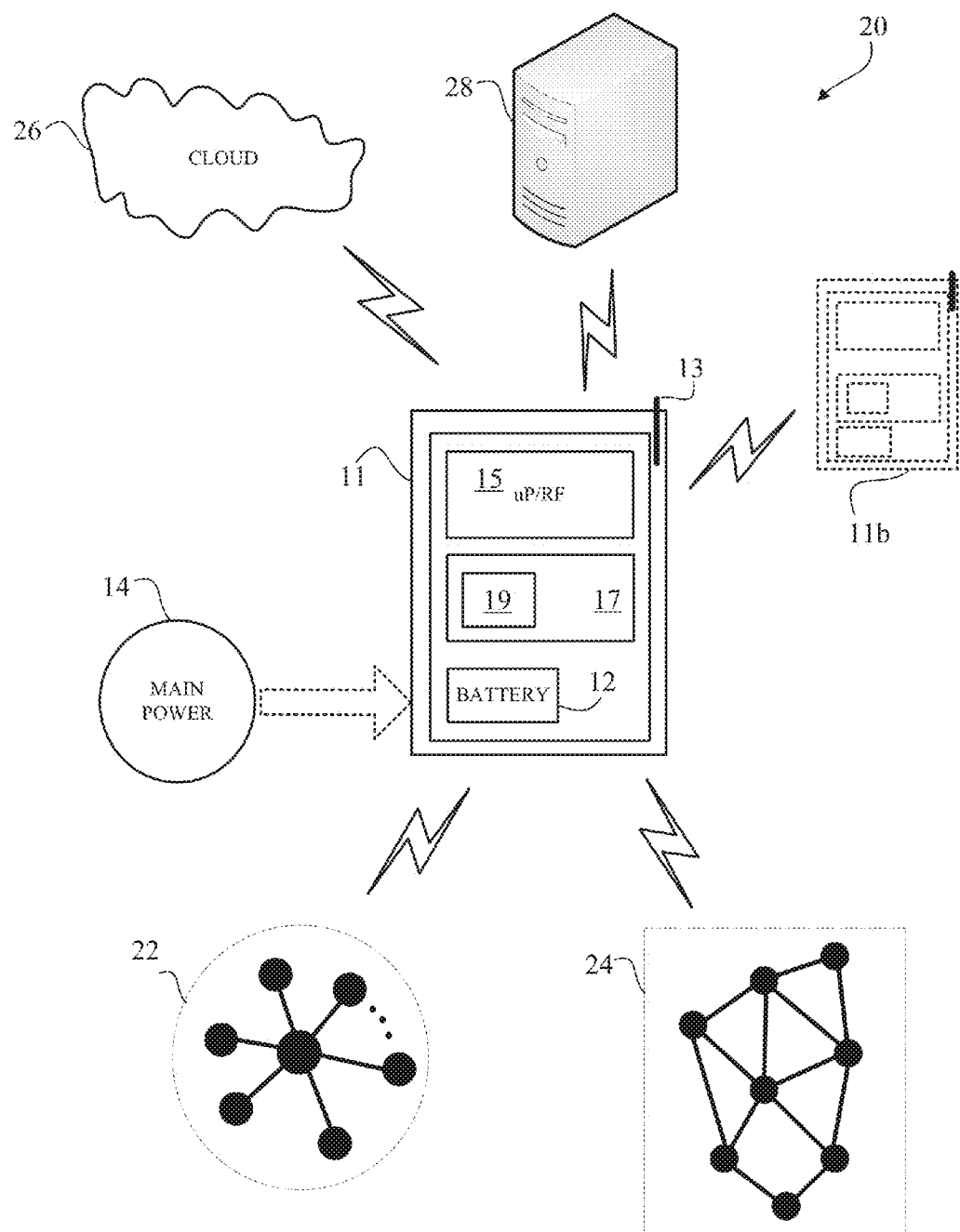
FIG. 2 is an illustration of a system level implementation of an exemplary IFD.

FIG. 2 is an illustration 20 of a system level implementation of an exemplary IFD 11, comprising a low-powered digital radio system that is IEEE Standard 802.15.4 compliant. The exemplary IFD 11 contains an antenna 13, with an on-board microprocessor/RF unit 15 with Firmware 17 and Software 19, that facilitates communication protocol procedures according to IEEE 802.15.4. The exemplary IFD 11 can be a fixed system (base station) or a portable system, being handheld or carried, depending on the form factor used and can be designed for a communication range of up to approximately 100 meters.

The IFD 11 can be either mains 14 or battery 12 powered. Other forms of power can be utilized, non-limiting examples being solar, chemical, and so forth. The exemplary IFD 11 can be designed to be an autonomous unit (wireless) that can be located in and around an area where a mixed population of IEEE 802.15.4 compliant devices are operating. For example, communication with RFDs within a star network 22 and FFDs within a peer-to-peer network 24 are shown in FIG. 2. The IFD 11 may also communicate with other IFDs 11b, and also with server(s) located in a cloud 26 or separately dedicated 28.

As with any modern wireless device, the exemplary IFD 11 may include complimentary subsystems (not shown) that allow for wireless media not defined in IEEE Standard 802.15.4, such as those supporting cellular or satellite communications, as well as Global Positioning System (GPS) capabilities, for example.

The exemplary IFD 11 may use any method of network discovery provided by the IEEE 802.15.4 standard to alert, address and exchange data/control frames with RFDs operating within a star-topology mode. The IFD 11 should also be capable of listening for discovery requests (a non-limiting example being a beacon request) or discovery data-frame broadcasts from end devices operating in the peer-to-peer topology mode; and to set up both ad-hoc and permanent networks to pass data frames both to and from FFDs. Using a combination of firmware and software 19, the exemplary IFD 11 should be autonomously capable of determining which type of end device it is currently communicating with, by analyzing a combination of information in the broadcast frame headers or content. The IFD 11 is also capable of functioning as a PAN coordinator and has the functionality to conduct data exchanges on all channels specified in the IEEE 802.15.4 specification. Aspects of such implementations are described below.

Figure 3:
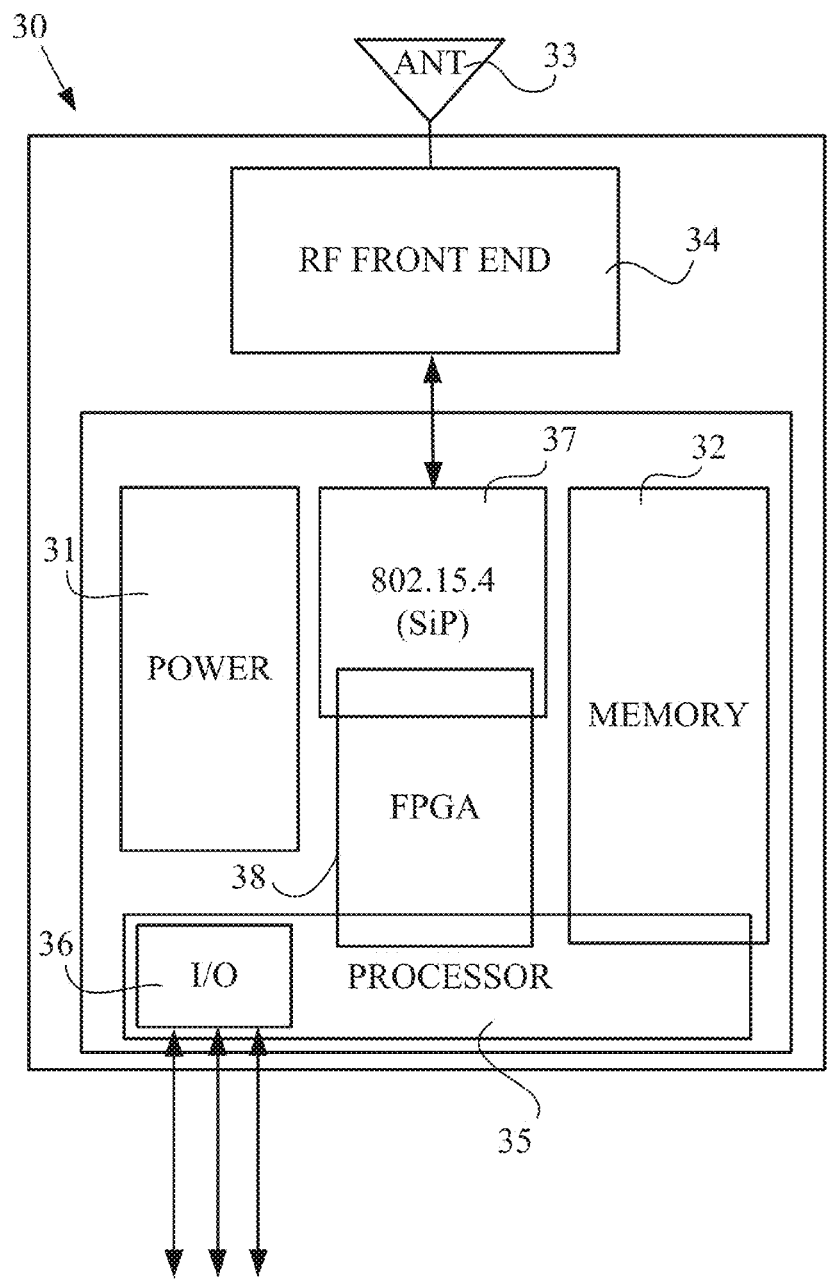
FIG. 3 is an illustration of a hardware block configuration for an exemplary IFD.

FIG. 3 is an illustration of a hardware block configuration that may be utilized in an exemplary IFD 30. A single antenna design is depicted in FIG. 3, with a power source 31, memory 32, antenna 33, RF transceiver front end 34, microprocessor 35 with input/output 36 to process all the collected data, and IEEE 805.15.4 module 37. The module 37 can be formed from a System-in-a-Package (SiP) or comprised of a number of integrated circuits enclosed in a single package or module. The form may be that of a set of vertically stacked silicon chips. The module 37 constituted by the SiP performs most of the IEEE 805.15.4 functions of the IFD 30. The IFD 30 also contains of a programmable integrated circuit device, such as a Field Programmable Gate Array (FPGA) 38. The FPGA 38 is a semiconductor device containing programmable logic components also referred to as logic blocks with programmable interconnections that can route logical decisions in many different directions. Logic blocks can be programmed to perform simple logical decisions such as logic gates or very complex functions such as decoders and mathematical functions. Logic blocks may also include memory elements. According to capabilities and design preference, the FPGA 38 and the microprocessor 35 may be configured as a single unit, as well as with the memory 32. Therefore, the microprocessor 35 may comprise the FPGA 38, SiP 37 and memory 32 into a single die. Additionally, the microprocessor 35 may operate as the RF front end 34 controller.

The microprocessor 35, memory 32, FPGA 38, or SiP 37 individually or in combination, contain executable instructions (e.g., code) for facilitating communication between devices within a star topology and mesh topology network, in accordance with (some) procedures dictated by IEEE 805.15.4, as further detailed below.

Figure 4:
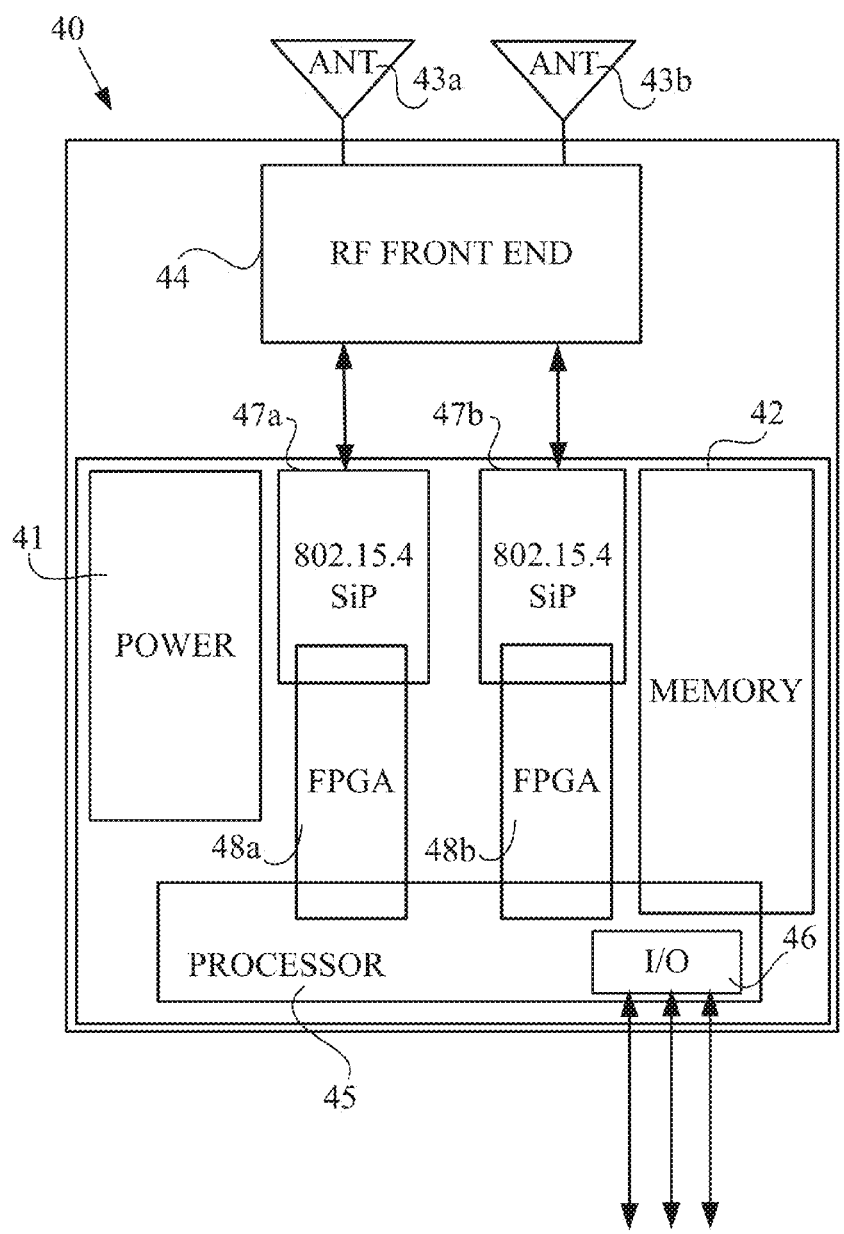
FIG. 4 is an illustration of another hardware block configuration for an exemplary multi-frequency IFD.

FIG. 4 is an illustration of another hardware block configuration in an exemplary IFD 40, for multiple frequency/mode operation. The exemplary IFD 40 is comprised of a power source 41, memory device 42, two antennas 43a and 43b, RF transceiver front end 44, microprocessor 45 with I/O 46 to process all the collected data, two IEEE 805.15.4 SiP devices 47a and 47b, and two FPGAs 48a and 48b. The exemplary IFD 40 is similar in capabilities to the exemplary IFD 30 of FIG. 3, with the added capability to process multiple (e.g., two or more) frequencies/modes from different IFDs or different topologies. Accordingly, modifications as discussed in reference to the embodiment of FIG. 3 may be equally applicable to the embodiment of FIG. 4.

For example, advances in hardware and radio devices may obviate the need for independent SiPs or independent antennas, etc. That is, based on the design and hardware capabilities chosen, for example, by using multi-frequency/processing RF integrated circuit devices, the exemplary IFD 40 may be capable of multiple frequencies/modes of operation, whilst only utilizing a single hardware system and/or antenna. Accordingly, modifications, improvements and other changes to the type and number of subsystems may be contemplated without departing from the spirit and scope of this disclosure.

By formulating a hardware implementation of IEEE 802.15.4 into a wireless device, the exemplary IFD provides a bridge between two currently incompatible LR-WPAN topologies for IEEE 802.15.4 compliant systems. The application of IEEE 802.15.4 to inventory tracking has created a unique need for the exemplary embodiments described herein, not previously developed under wireless technologies such as Bluetooth (IEEE 802.15.1) and WiFi (IEEE 802.11.x). While described in the context of the DHS's unique need for cargo security based on the IEEE 802.15.4 standard, the exemplary IFD can be transferred to other routing standards including, but not limited to, IEEE 802.11.x or 802.15.x systems or with perhaps different topologies, but with the same need to allow interoperability of different types of end devices.

Accordingly, other standards may be implemented and other (non-DHS) applications may be contemplated. For example, the IFD system may be applied to home appliances networks, home security networks, medical monitoring sensor networks, environmental sensor networks, consumer electronics networks and toys and games networks, to name a few. Additionally, other types of wireless networks may include static networks used for inventory to verify possession of stored materials such secret documents, weapons, hazardous materials, radioactive materials, etc., that need to be inventoried on a regular basis in which network topology may not change for long periods of time.

The exemplary IFD system can operate at a single frequency or have the ability to operate at different frequencies simultaneously. The antennas utilized by the exemplary IFD can be fixed in length and/or shape or be reconfigurable. The same antenna could be used to operate at different frequencies when reconfigured. Alternatively, more than one antenna can be used, each operating at a different frequency. An additional alternative would be to replace the FPGA with a semi-custom device such as an Application Specific Integrated Circuit (ASIC) or a custom designed integrated circuit device. The ASIC or custom integrated circuit hereby mentioned would be used to run the logic of the exemplary IFD.

IFD Messaging

A successful implementation of the exemplary IFD requires proper message processing. There are three basic types of messages that IFDs must recognize, parse and route, in the context of transmission control protocol/internet protocol (TCP/IP) as described in the following FIGS. 5-7. The IFD is understood to function as a topology bridge between RFDs and FFDs, where FFDs may be part of a mesh network. As such, the IFD must recognize when NAD coverage exists and whether that coverage is provided by a PAN under a star topology or FFD in a mesh topology. It is understood that in mesh topology, the NAD coverage is provided at the egress node of the mesh network. End-to-end acknowledgements (ACKs) between the Data Centers (DCs) and RFDs are understood to be employed for Command and Status Message exchanges. The connections between the NADs and DCs depicted below is under standard TCP/IP and, as such, is not described in great detail. End-to-end (ACKs) are employed for Command and Status Message exchanges.

Figure 5:
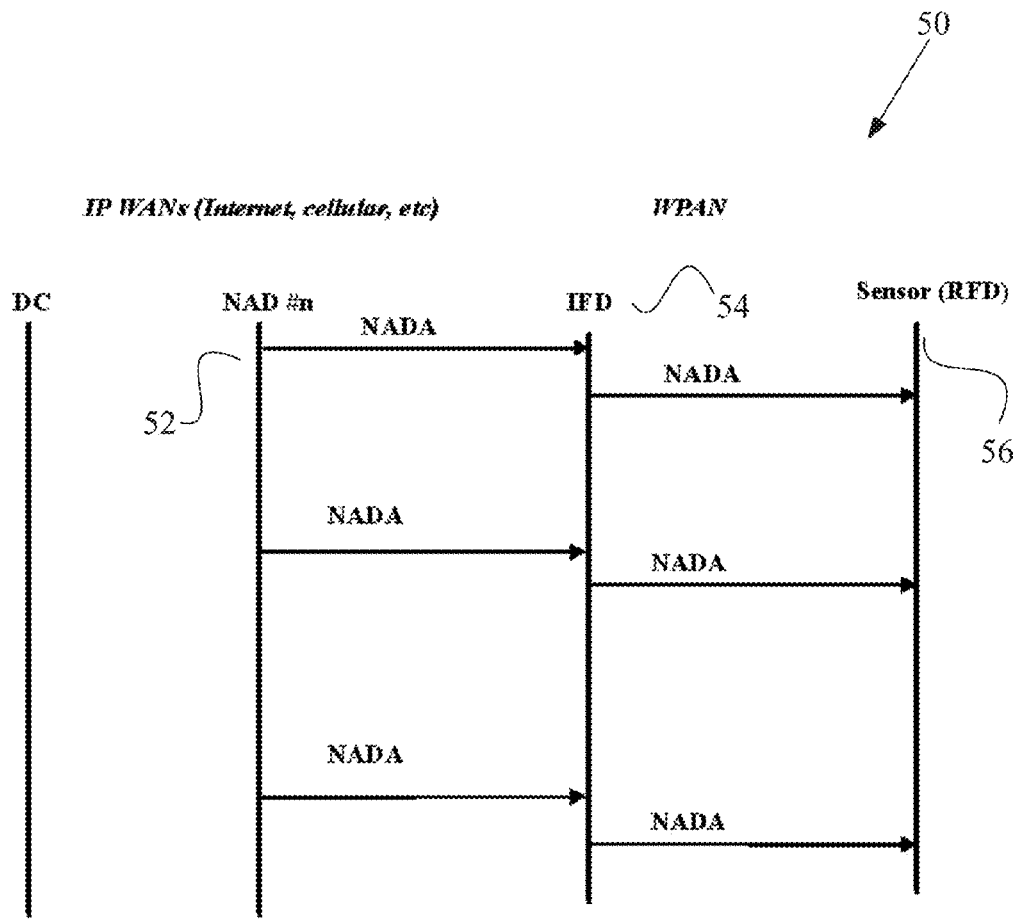
FIG. 5 is a network discovery ladder diagram depicting communication connections through the IFD mediator.

FIG. 5 is a network discovery ladder diagram depicting the communication connections between the NAD 52 to the end sensor 56 (e.g., RFD), via the IFD 54 mediator. As a prerequisite, data flow is depicted using a Passive Scan network discovery using a NADA from the NAD 52. Active scan network discovery is not depicted, as any active scan implemented for mesh routing is assumed to implement clear channel assessment (CCA) in some form, and does not interfere with the passive scan method described herein. All NADs 52 perform CCA before transmitting a NADA (or any other) data frame. Accordingly, passive network discovery with optimal battery conservation can be achieved.

In discovery, the IFD and sensor (RFD) must listen for NADAs for a specified period of time (e.g., at least 20 milliseconds each second when not in coverage but in many implementations may be as regarded as State Aware and choose to not to respond to every NADA message once coverage is established). Upon discovery, protocols established by TCP/IP can be followed.

Figure 6:
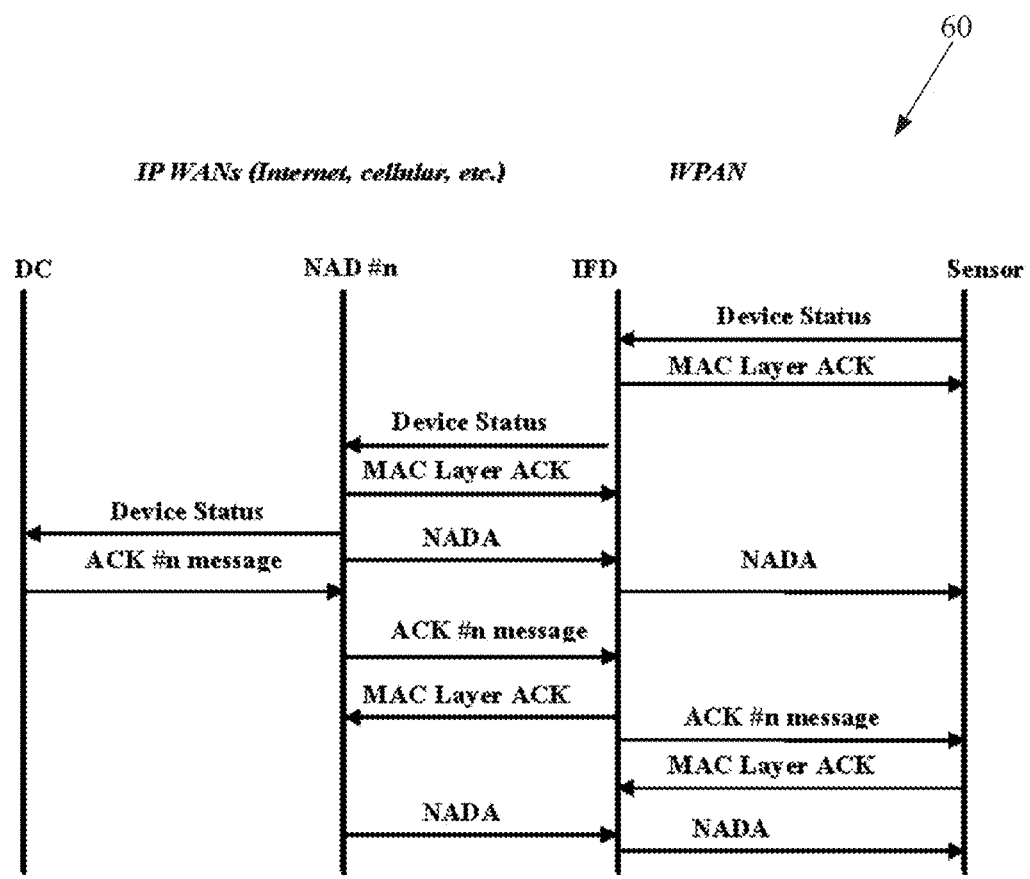
FIG. 6 is a message ladder diagram between communicating devices.

FIG. 6 is a message ladder diagram 60 between the respective devices. As a prerequisite, network discovery is understood to be complete. All status messages flow from the sensor (e.g., RFD) to the DC, and that all NADs, IFDs and sensors perform clear channel assessment before transmitting. It is also understood that the ladder diagrams described herein are not to time scale, recognizing that the duration of the Device Status message transmission is small compared to the NADA message repetition interval. The MAC Layer ACK frame can be sent within the time duration as specified by IEEE Standard 802.15.4. The message ladder diagram 60 is based on standard TCP/IP and, as such, is not described in great detail.

Figure 7:
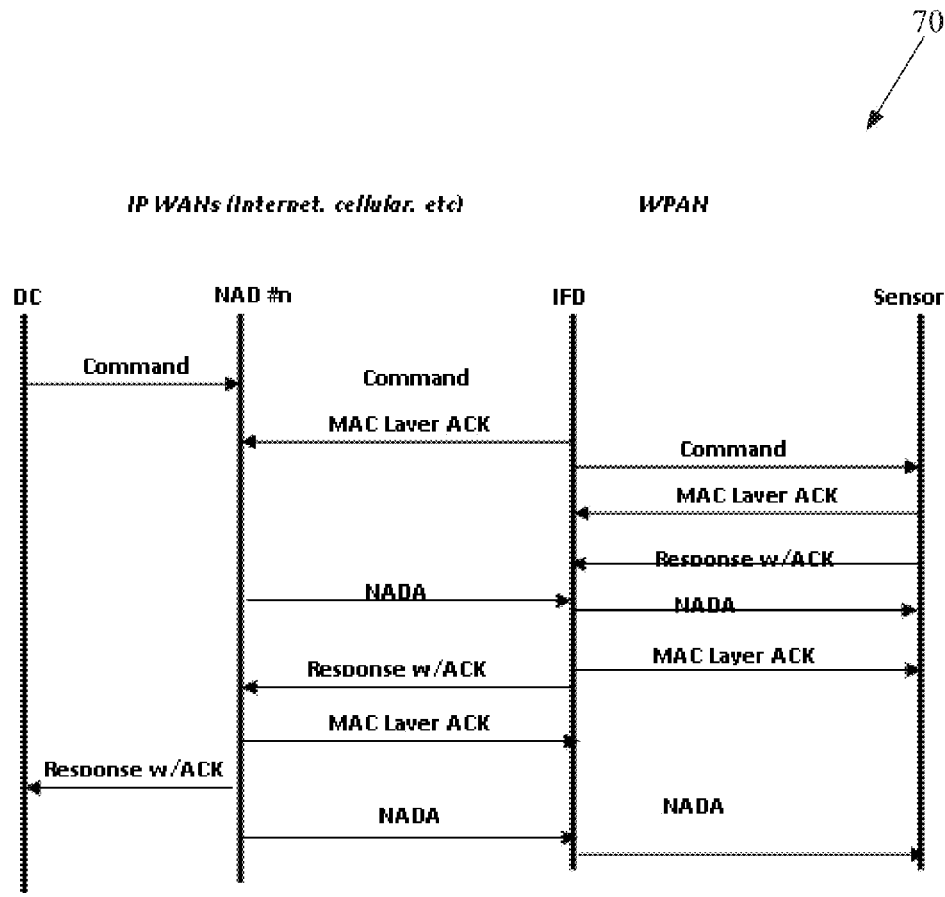
FIG. 7 is a command message ladder diagram between communicating devices.

FIG. 7 is a command message ladder diagram 70 between the respective devices. As a prerequisite, network discovery is understood to be complete. All command messages flow from the DC to the Sensor (e.g., RFD) and all NADs, IFDs and sensors perform clear channel assessment before transmitting. It is understood that the DC knows which NAD to use based on the Device Status message sent after Network Discovery. Optionally, the DC may use the last known NAD. The command message ladder diagram 70 is based on standard TCP/IP and, as such, is not described in great detail.

Having laid a foundation for network discovery and messaging utilizing an exemplary IFD, additional details and modifications to the above paradigms and other aspects of communication control are described. For example, the exemplary IFD can selectively scan the RF spectrum for network discovery. The exemplary IFDs do not need to scan all available RF channels.

Figure 8:
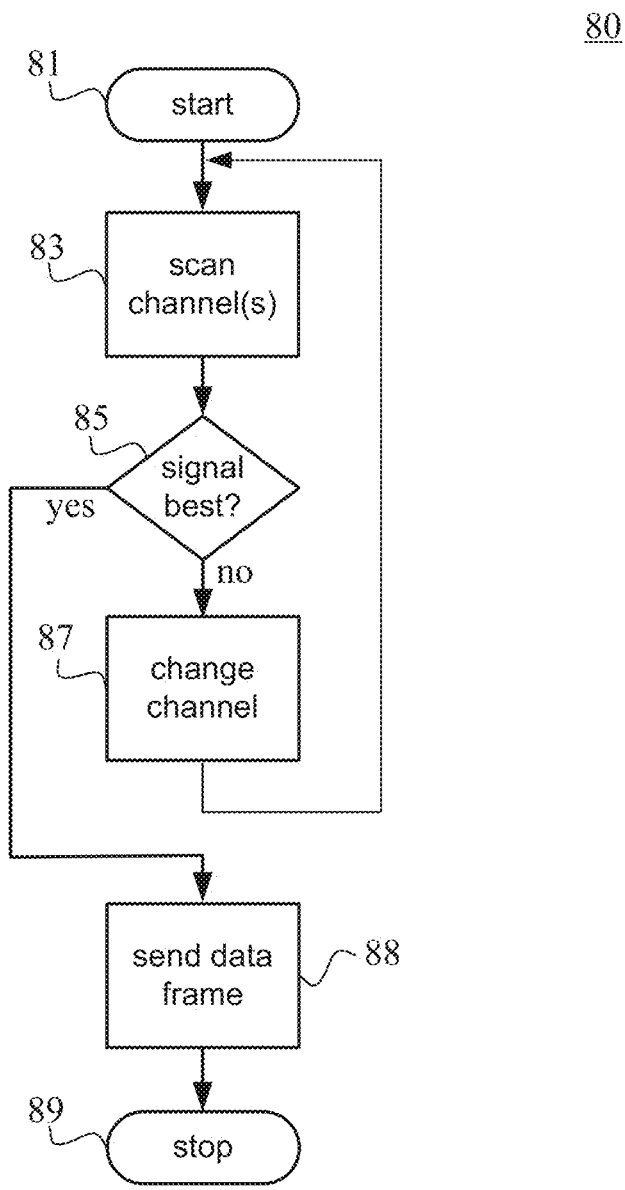
FIG. 8 is a flow chart illustrating an exemplary process for channel selection and data forwarding.

As shown in the flow chart of FIG. 8, an exemplary IFD process 80 can start 81 and passively scan 83 using a defined subset of IEEE 802.15.x Standard's RF channels to detect NADAs. A specific subset of channels can be defined. These channels can be selected to co-exist with co-located WiFi networks, if present. The scanned channel(s) can be evaluated for signal strength or another metric 85 and if a candidate channel(s) among multiple NADs is acceptable or considered "best," the exemplary process 80 via the IFD can relay an encrypted data frame message 88 destined for either its mated end device or a data center that may require retransmissions across LANs and WANs. Upon relay or transmission, the exemplary process 80 may terminate 89. If the candidate channel(s) metric is unsatisfactory, the exemplary process 80 can rescan either the originally scanned channel(s) or seek other channel(s), whereas the above steps are repeated. Thus, utilizing such an approach, management messages, including spontaneous non-compliant messages can be ignored in total.

Figure 9:
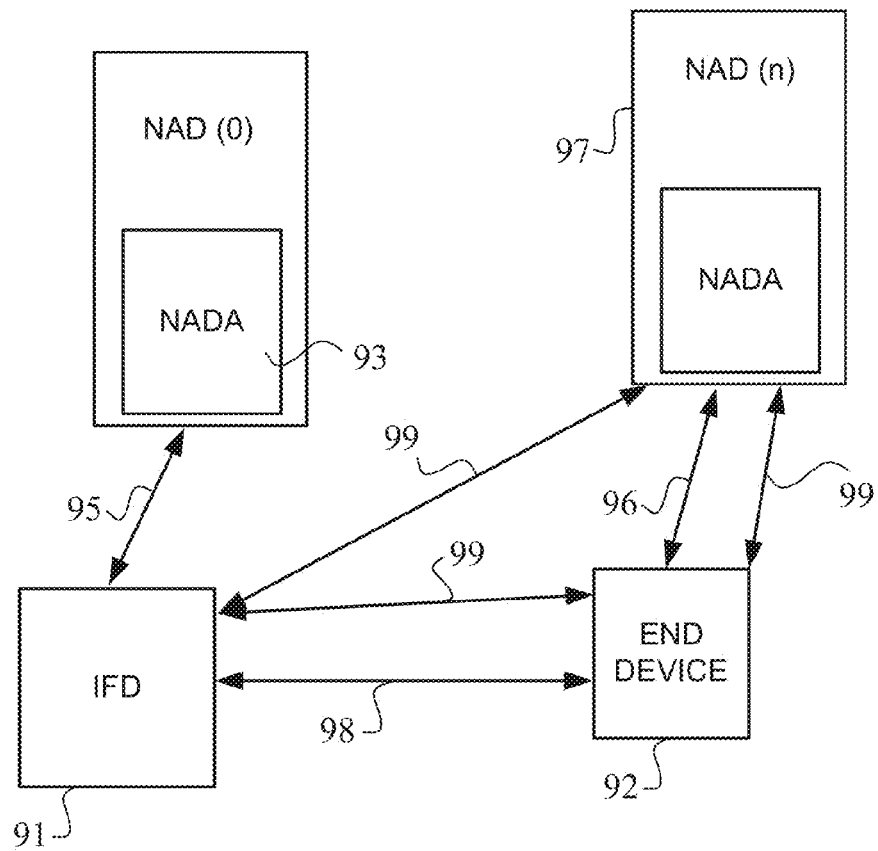
FIG. 9 is a block diagram of an exemplary polling exchange.

As shown in FIG. 9, another aspect of the exemplary IFD 91 can be devised wherein the IFD 91, instead of the end device 92, can poll for possible waiting data. The exemplary IFD(s) 91 can receive the NADs' NADA messages 93 (as above) during network discovery and, thereafter according to a battery conservation (wake-up) timing choice, illustrated here as via link 95. Each NADA 93 can contain a list of end device identity codes, for devices that have undelivered messages (message waiting) at a NAD 97. Multiple NADs may hold the same message, to support end device mobility. The IFD 91 relays via bi-directional link 98 this information to its mated end device 92 which passively detects its (end device) identity in the list in the NADA 93. On detecting a message waiting for a given end device 92, that end device 92 transmits a request message to the chosen NAD 97 to cause the waiting message content to be transmitted via bidirectional link 99, which may be sent via bidirectional link 99 to the IFD 91 and forwarded to the end device 92, or directly sent from the chosen NAD 97 to the end device 92. In this configuration, polling to inquire about waiting messages is eliminated.

In another aspect, transmission time slot requests can be configured. For example, the NADs with NADA message content enable exemplary IFDs to use the IEEE's 802.15.4 Standard's carrier sense multiple access with collision avoidance (CSMA/CA) for medium access rather than time division multiple access (TDMA). Precise message latency management is, thus not required, as is the purpose of TDMA time slots. The numerous undesired management messages for time slot acquisition and renewal of existing systems are, thus eliminated to support, for example, battery powered cargo security applications.

Additionally, the exemplary IFDs can respond to the NADA message of the NADs instead of the IEEE 802.15.4 Standard's beacons, that is, custom beacon message content can be facilitated. For example, CSMA/CA coordinated NADA messages can be used as described above. The NADA messages can be ordinary user data messages. Commonly available commercial products need not expect beacon payload content be present. Therefore, no alteration of the IEEE 802.15.4 Standards-compliant commercial products' firmware is needed in this configuration. This eliminates the risks and warranty or life cycle support issues arising from altered commercial products used as an element of a larger device. In this implementation, network existence broadcast messages can be achieved without frame collisions.

Figure 10:
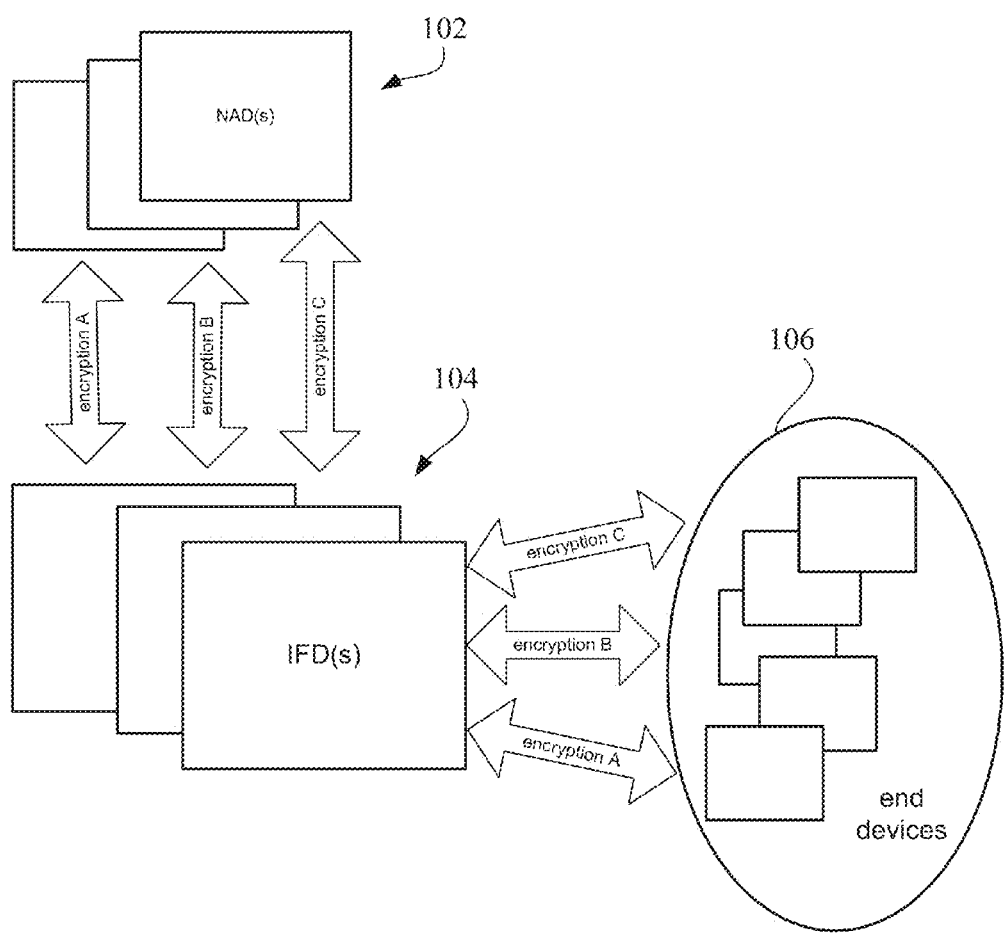
FIG. 10 is block diagram of an exemplary encryption level management.

The exemplary IFDs can also be implemented so that network existence broadcast messages are supplied with system security. The IEEE 802.15.4 Standard addresses only layer 2 encryption with a shared key mechanism. As illustrated in FIG. 10, the NAD devices 102 and overall end to end system design enables end to end encrypted messages to be relayed by the IFDs 104 to end devices 106 and the destination data center (not shown), using encryption (for example, layer 3 encryption), independent of all types and sorts of transport networks in the LAN/WAN paths. The exemplary IFD supports the NAD's NADA message content that includes a code to indicate which undisclosed encryption key is required for communicating with the data center affiliated with a given NAD. This enables a key unique to each end device 106 mated to the IFD 104 so that compromise of an encryption key does not affect other end devices' security.

Another feature of the exemplary IFD system is that each NAD's NADA message can contain a definition of the time until the next (future) NADA will be transmitted. IFDs can use this information to select a power conservation cycle time. Thus, the interval may vary from site to site and may vary in time, according to needs such as optimizing battery power consumption strategies, but with interoperability among products and suppliers that use different strategies.

Figure 11:
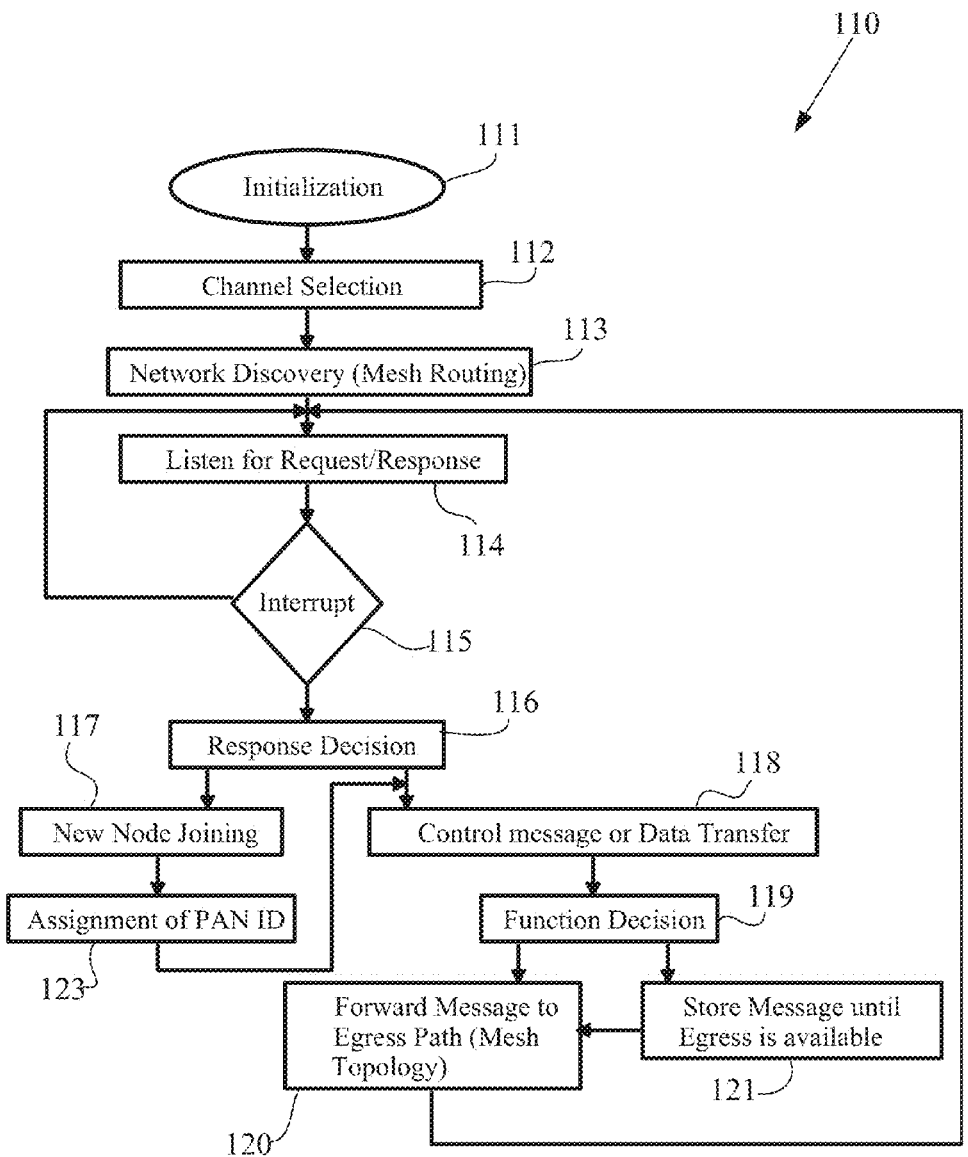
FIG. 11 is a diagram illustrating an exemplary process for exchange and pairing with an IFD.

FIG. 11 is a flow chart illustrating an exemplary process 110 for message exchange and pairing with the exemplary IFD. Prior to initiation of the exemplary process 110, the exemplary IFD is provided with the MAC Address of one or more sensors acting as end devices (for example, RFDs in a star topology). This exemplary pairing may be hard-coded into the IFD firmware or programmable via the user interface.

The exemplary process 110 begins with initialization 111, where the IFD establishes the network discovery parameters and mesh network egress path. Next, channel selection 112 is performed. The IFD may automatically cycle through all the channels (16 channels are defined in the IEEE 802.15.4 standard) or restrict itself to one or more channels with a hierarchy defined by the particulars defined by a designated mesh routing implementation. After channel selection 112, the exemplary process 110 proceeds to network discovery 113, where the IFD conducts network discovery as defined by routing implementation requirements per IEEE 802.15.4. After network discovery 113, the IFD proceeds to listen for a request/response 114. Upon reception of a compliant response (per initialization parameters), an interrupt 115 will occur where the request is granted. If no compliant response is received, the exemplary process 110 cycles back to listening stage 114.

Upon granting the request, a response decision 116 is made, determining whether the request is for a new node requesting joining 117 or if the request is for control/data information transfer 118. If the requesting entity is a new node 117, then the exemplary process 110 proceeds to assign a PAN ID 123 to the new node. The process for joining the node PAN IDs to current PAN IDs already joined is defined in a mesh routing implementation and/or under the IEEE 802.15.4 standard. Subsequent to the assignment of the PAN ID 123, any further communication from this joined node is understood to be for control/data information transfer. Therefore, the exemplary process 110 forwards the communication to the control/data information transfer module 118.

From the control/data information transfer module 118, a function decision 119 is made regarding whether to forward the communication (e.g., message) to forwarding module 120 for forwarding to an egress path to mesh devices (as determined through network discovery 113 module). If there is no egress path readily available (e.g., timeout, out-of-range, etc.), the function decision module 119 stores the communication/message 121 until an egress path is available. When the egress path becomes available, the exemplary process 110 proceeds to forward the stored message 121 to the forwarding 120 module. After forwarding has been accomplished, the exemplary process 110 returns to listen for the next request/response 114. The exemplary process 110 loops until an internal or external command to abort/exit the process is executed (not shown).

In view of the above examples, an exemplary IFD can be devised to provide communication between star and mesh topologies, utilizing IEEE 802.15.4 and TCP/IP protocols, thereby enabling communication and tracking capabilities previously unknown in the art. Accordingly, an efficient and effective means for communicating between non-compatible, pre-defined topologies can be realized. While the above FIGS. detail various aspects of the exemplary systems and methods, it is understood that one of ordinary skill in the art may make modifications and changes to the various elements and features, without departing from the spirit and scope herein. For example, advances in integrated circuit device design may enable the described SiP hardware to be implemented on the FPGA hardware. Similarly, the antenna switches maybe optional, the antennas being frequency sensitive, and so forth.

Accordingly, it is understood that the specific order or hierarchy of steps in the processes disclosed is an example of exemplary approaches. Based upon design preferences, the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition to the described hardware components of the exemplary IFDs, FPGA, various illustrative logical blocks, modules, and circuits described in connection with the embodiments disclosed herein may be implemented or performed with a general purpose processor, a digital signal processor, ASIC, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components in the IFD.

Therefore, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A wireless intermediate functional device for wireless communication in a cargo conveyance security system comprising:
 a processor with memory;
 a radio frequency transceiver front end communicating with the processor;
 an antenna coupled to the front end; and
 a power source providing power to the processor and front end;
  wherein the processor executes computer instructions stored in the memory for:
   selectively scanning a predetermined set of radio frequency channels for network discovery;
   selecting a channel with best signal characteristics;

discovering a first network access device configured for a first network topology;

discovering a second network access device configured for a network topology different from the first network topology;

establishing communication with the first and second network access devices; and sending data to at least one of the network access devices.

2. A method for wireless communication in a cargo conveyance security system between reduced functional devices in a star topology network having a central coordinator capable of operating as a network access device, and with fully functional devices in a mesh topology network, comprising:

providing an intermediary functional device comprising:

a processor with memory;

a radio frequency transceiver front end communicating with the processor;

an antenna coupled to the front end; and a power source providing power to the processor and front end;

into the star topology and mesh topology networks;

selectively scanning a predetermined set of radio frequency channels for network discovery;

selecting a channel with best signal characteristics;

discovering a network access device announcement from a network access device via the intermediary functional device;

determining whether the network access device is from a star or mesh network via the intermediary functional device;

establishing communication with a designated reduced functional device via the intermediary functional device;

forwarding the network access device announcement to the designated reduced functional device; and sending data to the reduced functional device.

\* \* \* \* \*